July 29, 1952 L. T. SACHTLEBEN 2,604,808

ADJUSTABLE MOUNTING FOR OPTICAL APPARATUS

Filed July 11, 1951 2 SHEETS—SHEET 1

INVENTOR
LAWRENCE T. SACHTLEBEN
BY
[signature]
ATTORNEY

July 29, 1952 L. T. SACHTLEBEN 2,604,808

ADJUSTABLE MOUNTING FOR OPTICAL APPARATUS

Filed July 11, 1951 2 SHEETS—SHEET 2

INVENTOR
LAWRENCE T. SACHTLEBEN
BY [signature]
ATTORNEY

UNITED STATES PATENT OFFICE 2,604,808

ADJUSTABLE MOUNTING FOR OPTICAL APPARATUS

Lawrence T. Sachtleben, Haddonfield, N. J., assignor to Radio Corporation of America, a corporation of Delaware Application July 11, 1951, Serial No. 236,135

9 Claims. (Cl. 88—1)

This invention relates to an optical system and particularly to color-selective optical apparatus such as employed in some color television cameras.

The present invention pertains to an optical system for transferring light between an object plane and a plurality of separate image planes. A specific embodiment of the invention is in a color television system in which signals representing a plurality of the component image colors are to be developed simultaneously or substantially so. It is customary, in such systems, to provide a signal-generating tube for each of the component image colors. An example of a truly simultaneous color television system, employing a signalling channel for each of the color representative video signal trains, is shown in U. S. Patent 2,335,180, granted November 23, 1943 to Alfred N. Goldsmith and titled "Television System." An example of a substantially simultaneous color television system, employing a single signalling channel, is described in an article titled "A Six-Megacycle Compatible High-Definition Color Television System" by RCA Laboratories Division, published in the RCA Review, vol. X, No. 4, December 1949, p. 504. Such a system also is the subject matter of a copending U. S. application of John Evans, Serial No. 113,384 filed August 20, 1949 and titled "Color Television," now Patent No. 2,562,496, issued July 31, 1951. In this type of system, the different color representative video signal trains are multiplexed on a time division basic and transmitted over the single communication channel.

In order to direct light of the different component colors to the respective signal-generating tubes, it is necessary to employ apparatus by which to separate the light into its component colors. A particularly efficient device of this character is an arrangement of dichroic reflectors. Representative examples of color-selective apparatus of this character are shown in U. S. patents to Glenn L. Dimmick 2,379,790, granted July 3, 1945 and titled "Dichroic Reflectors" and 2,412,496, granted December 10, 1946 and titled "Color Selective Reflector."

In a three-color selective system of the character described, it generally is convenient to employ a crossed arrangement of the dichroic reflectors. In such an arrangement the dichroic reflectors are mounted so that they effectively bisect one another substantially at right angles. A crossed dichroic reflector of this type is shown and described in the copending U. S. application of Alfred C. Schroeder, Serial No. 731,647, filed February 28, 1947. In a practical form, one of the reflectors is made as a full-length plate member and the other is made in two substantially equal half-length plate members for mounting with edges thereof virtually in contact with opposite faces of the full-length plate. In order that different portions of the image reflected by the two half-length plates be in register, it is necessary that they be mounted so as to be in substantially precise alignment and with their respective surfaces parallel and in the same plane. Furthermore, it is necessary that both of the half-length plates be mounted perpendicularly to the full-length plate so that the parts of the image reflected by the full-length plate be in register, irrespective of whether they are reflected before or after transmission through the half-length plates. Furthermore, in order for such color-selective optical apparatus to be successfully employed in color television systems of the character described, it is necessary that all of the plates have a high degree of surface flatness and parallelism. The plates also must be held in the mounting structure in such a manner that the flat surfaces thereof are not strained in any way which will change their configurations.

A crossed dichroic reflector of the type described permits light of one selected color to pass through both of the reflectors and reflects light of the other two colors in opposite directions in paths which are substantially perpendicular to the path of the transmitted light. Accordingly, when such a device is used in a television camera, it is desirable to mount the signal-generating tubes as nearly parallel to one another as practicable. Hence, in a preferred form of a color television camera, there also is provided a pair of auxiliary reflectors which may or may not be color-selective as desired and which are placed respectively in the perpendicular light paths so as to direct the reflected light generally in the same direction as that in which the transmitted light is directed. Consequently, in order to standardize and to effect substantial uniformity in the mounting devices for the signal-generating tubes, it is necessary to provide mountings for the auxiliary reflectors which will effect the desired re-direction of the light onto these tubes.

Accordingly, it is an object of the present invention to provide improved adjustable mountings for substantially flat optical elements in a multiple light path system, such as in a color television camera.

Another object of the invention is to provide improved mountings for plane optical elements so as to permit adjustment of the positioning of these elements in two or more degrees of freedom.

A further object of the present invention is to provide improved adjustable mountings for the different parts of a crossed dichroic color-selective reflector of the character described so that the half-length plates are mutually parallel, coplanar, and also perpendicular to the full-length plate.

Still another object of the invention is to provide an improved dichroic plate mounting which places substantially no strain upon either surface of the plate and, therefore, does not tend to distort the plate surfaces.

The present invention, in one of its simplest forms, comprises a pair of supports for an optical plate, such as a dichroic reflector element. Each of the supports has a face formed thereon and each face is provided with a plurality, such as three, of resilient pads which protrude therefrom. The pads are located in corresponding positions in the faces of the respective supports so that, when the supports are fastened together with their faces opposite to one another, the correspondingly positioned pads form pairs of pads which grip the plate by pressing upon its opposite surfaces. The mounting in accordance with this invention may be provided additionally with a means for varying the pressure exerted by one of the pads of one or more predetermined pairs of said pads so as to adjust the positioning of the plate by pivoting it about one or more axes through other pairs of said pads.

In a particular embodiment of the present invention, there is provided a mounting for a crossed dichroic reflector having two pairs of somewhat similar supports of the type referred to. The face of each support preferably extends in one direction for at least the length of the dichroic member or members to be mounted thereby and in the other direction for approximately one-half of the width of the dichroic element. Also, each of the supports is provided with a set of the described resilient pads. In the case of the pair of supports associated with the two half-length plates, there is provided a set of the resilient pads for each of the half-length plates. The two pairs of supports, when fastened together so as to grip the different dichroic reflector plates, are additionally joined to form a unitary mounting for the crossed dichroic reflector plates. In order to achieve this result, each of the supports of the mounting is provided with a recess which is suitably placed to receive the portions of the plates extending from the other pair of supports. By this means the dichroic reflector plates are mounted so that no appreciable strain is placed upon the respective surfaces thereof which would tend to distort or fracture them.

The different supports of the mounting are provided with openings in the width dimensions thereof of such a character that, when the supports are fastened together, there are provided four light paths to the dichroic reflector. Also, in accordance with this invention the mounting is provided with one or more movable members, such as screws, which are located in such a manner that one or more of the resilient pads may be adjusted so as to adjustably position one or more of the dichroic reflector plates. By such means the desired relationship of the dichroic reflector plates to one another may be secured.

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings.

Figure 2:
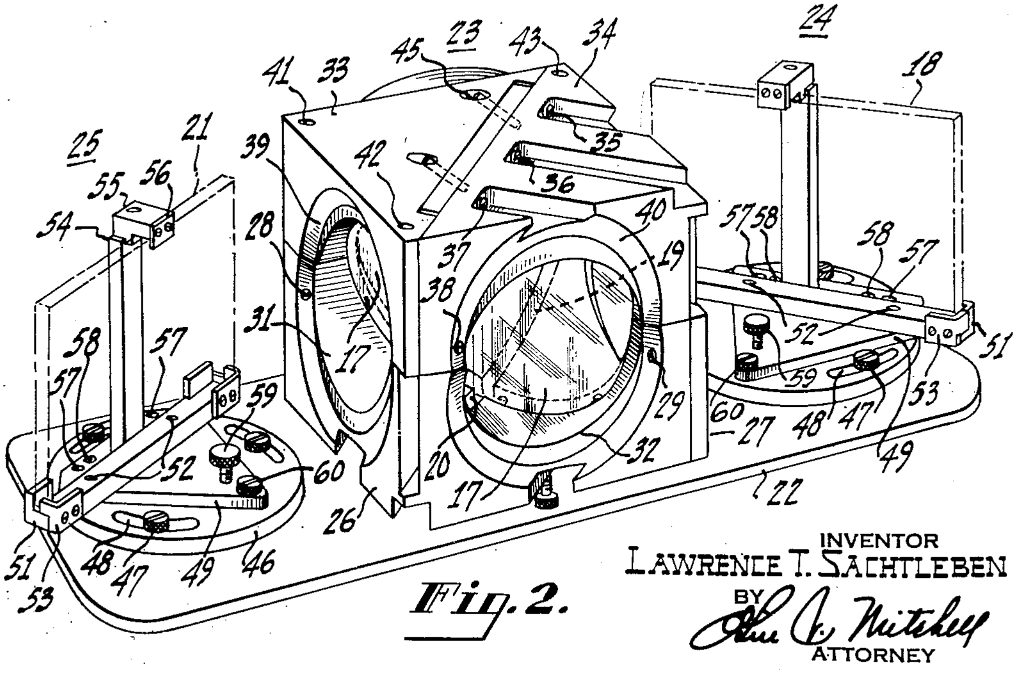
Figure 2 is a perspective view of a dichroic reflector mounting in accordance with this invention for employment in a system of the character shown in Figure 1.
Figures 2A, 3, 4, 5:
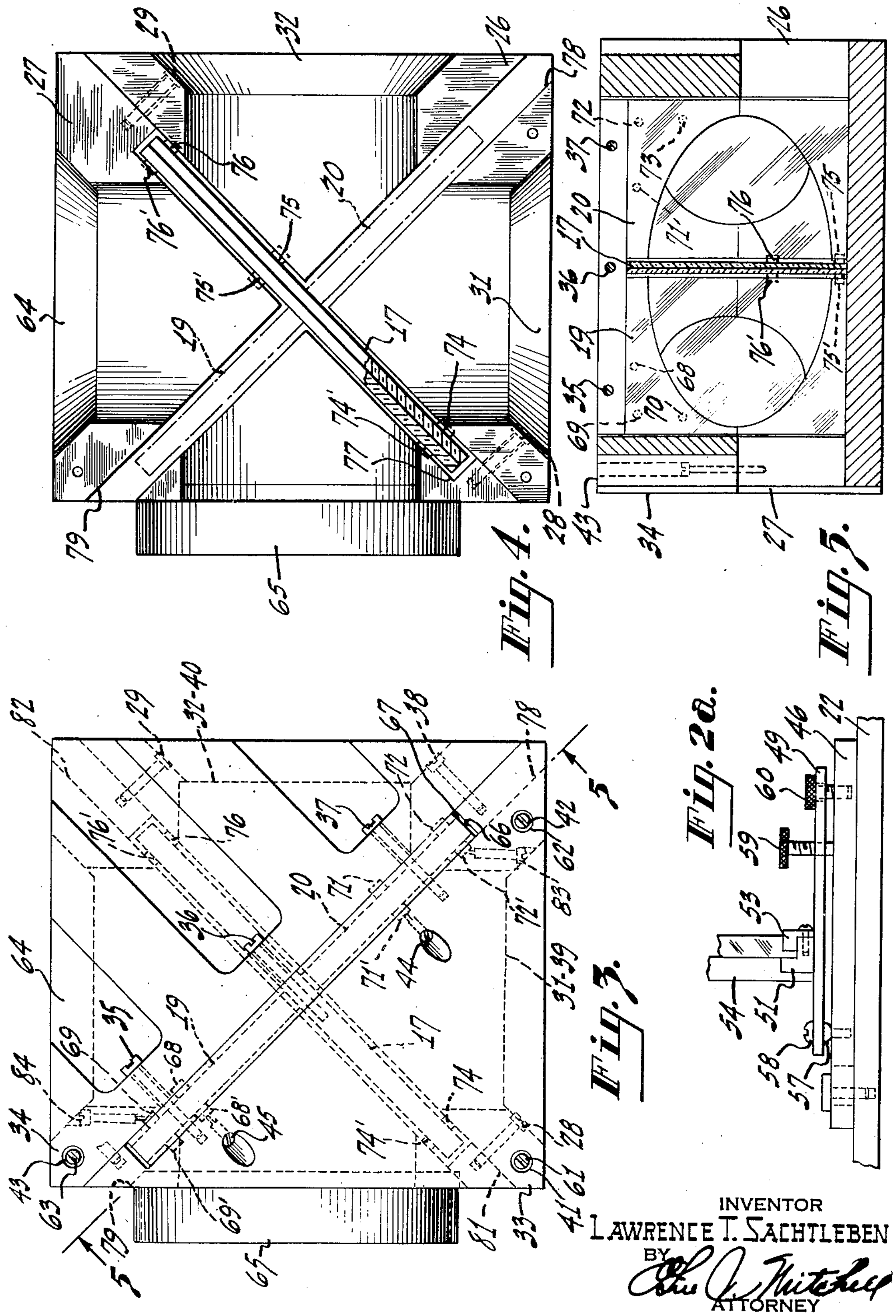

Figure 2*a* is a fragmentary elevational view, partly in section, of the mirror mounting of Figure 2;

Figure 3 is a top view, to a somewhat enlarged scale, of the dichroic reflector mounting of Figure 2;

Figure 4 is a plan view, to a somewhat enlarged scale, of the dichroic reflector mounting in accordance with this invention shown in Figures 2 and 3 with the top half thereof removed to show a plan view of the bottom half of the mounting; and, Figure 5 is a vertical sectional view of the dichroic reflector mounting in accordance with this invention taken on the line 5—5 of Figure 3.

Figure 1:
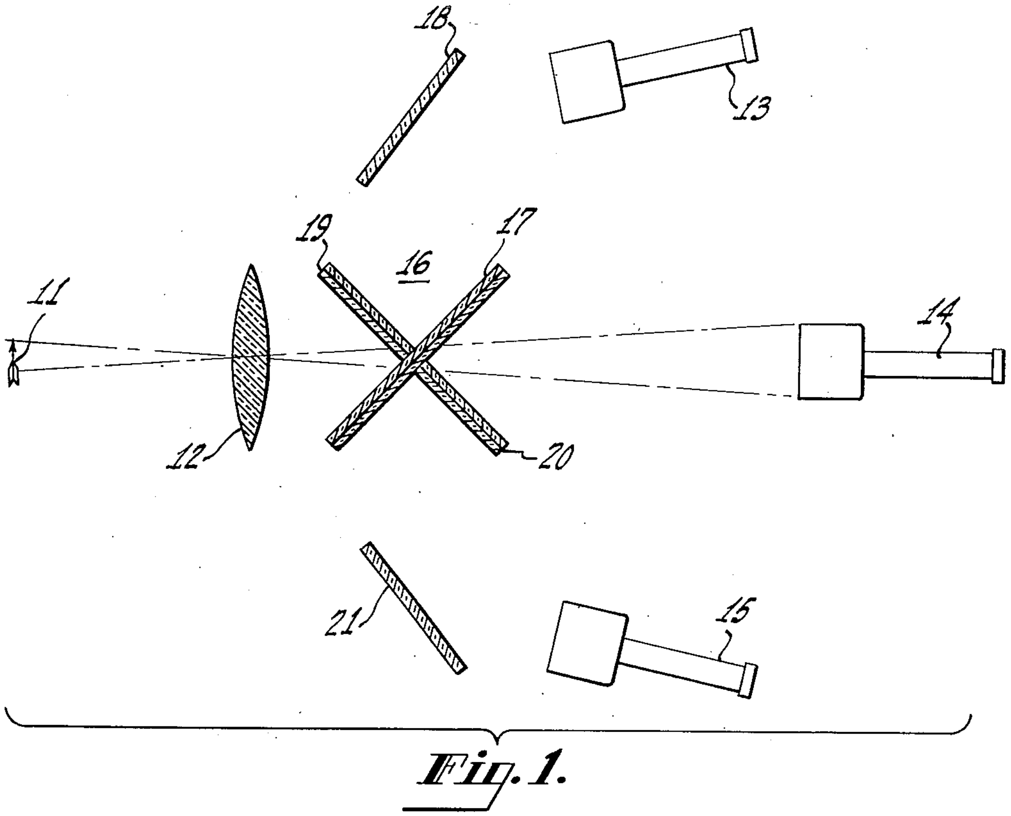
Figure 1 is a diagrammatic representation of the general type of optical system in which a crossed dichroic reflector mounted in accordance with the present invention may be used.

Reference first will be made to Figure 1 of the drawings for a brief description of a typical optical system in which a crossed dichroic reflector provided with a mounting in accordance with this invention may be used. For the purpose of illustrating the invention it is assumed that the dichroic reflector is used as the colored light separator in a color television camera apparatus. It will be understood, however, that neutral reflectors may be substituted for the dichroic reflectors to separate the light into different paths, if desired, without departing from the invention. In such a case, color selection may be accomplished by transmission filters placed in the respective light paths.

Light from the subject 11 is directed by a suitable optical system, represented diagrammatically in this figure, by a lens 12, onto the video signal-generating apparatus including camera tubes 13, 14 and 15. A representative form of camera tube is an image orthicon such as described in a paper titled "The Image Orthicon—A Sensitive Television Pick-Up Tube" by Rose, Weimer and Law published in the Proceedings of the IRE, volume 34, page 424, July 1946. In this case, it is assumed that the camera tubes 13, 14 and 15 are to receive red, green and blue light respectively from the subject 11 so as to generate video signals representative of these three component colors.

Accordingly, a crossed dichroic reflector 16 is included in the light paths between the optical system 12 and the different camera tubes. In one color-selective arm, the dichroic reflector includes a full-length plate 17 which is provided with a coating in accordance with the teachings of the previously referred to Dimmick patents so as to reflect red light and to transmit blue and green light. Accordingly, the red light derived from the subject 11 is directed toward a mirror 18 which, in turn, reflects it toward the red camera tubes 13. In the other color-selective arm, the crossed dichroic reflector also includes a pair of half-length plates 19 and 20 which are provided with a color-selective coating of a character to reflect blue light and to transmit red and green light. The blue light is directed toward a mirror 21 by which it is reflected toward the blue camera tube 15. The green light which is transmitted by both color-selective arms of the crossed dichroic reflector is directed toward the green camera tube 14.

Preferably, although not part of the present invention, each of the dichroic deflectors should be in the form of two plates of glass, or equivalent transparent material, having the reflective coating on the inner face of one of the plates. In such a structure, both the reflected and transmitted light travel substantially equal distances in the glass, thereby equalizing or normalizing the astigmatism for all colors of light inherently introduced by the dichroic reflectors. Such a feature forms the subject matter of a copending U. S. application of J. E. Albright, Serial No. 191,068, filed October 19, 1950 and titled "Color Selective Optical System."

It is seen from a consideration of the arrangement of the crossed dichroic reflector elements that, in order for all parts of the blue image which is projected onto the blue camera tube 15 to be in register it is necessary that the two half-length plates 19 and 20 be mounted in such a way that they are in substantially precise alignment and with their respective surfaces parallel and in the same plane. Also, it is seen that the red image is reflected by the full-length plate 17 in such a way that part of it is reflected before transmission through the blue reflective half-length plate 19 and part of it after transmission through this plate. Therefore, in order that all parts of the red image be in register, it is necessary that the half-length plate 19 be mounted with maximum precision perpendicularly to the full length plate 17. Therefore, it also is required that the other half-length plate 20 be mounted perpendicularly to the full-length plate.

A mounting for the crossed dichroic reflector in accordance with this invention which is capable of providing the desired precision of the relationship between the dichroic reflector plates is shown generally in Figure 2 to which reference now will be made. In this figure, there is shown, not only the mounting for the crossed dichroic reflector plates, but also mountings which are provided for the reflecting mirrors 18 and 21 so as to properly direct the color-selected light images onto the respective camera tubes. The apparatus is supported on a base plate 22 with the dichroic deflector mounting 23 located substantially in the middle and the adjustable mountings 24 and 25 for the mirrors 18 and 21 respectively on opposite sides of the dichroic reflector mounting. The dichroic reflector mounting is generally cubical in form and comprises essentially four supports joined together to securely grip the dichroic reflector plates. The supports 26 and 27 comprise a first pair of supports by which to grip the full-length plate member of the dichroic reflector. In this view, only a small corner portion of the support 27 is visible. It will be understood, however, that it is substantially complementary in form to the support 26 and is located generally at the rear of the mounting as viewed in this figure. The general form of the support 27 and its relationship to the support 26 will become more apparent from a consideration of other views of the device to be described subsequently.

The pair of supports 26 and 27 are fastened together by means of a plurality of screws such as 28 and 29 extending through clearance holes in the support 26 and into correspondingly located tapped holes in the support 27. Also, each of the supports 26 and 27 is provided with openings such as defined by the arcuate cut-away sections 31 and 32 of the support 26.

The mounting also includes a second pair of suports 33 and 34 which are provided with opposing faces extending substantially diagonally of the mounting. In this case, the diagonal faces are at right angles to the diagonal faces of the first, or lower, pair of supports 26 and 27. The second, or upper, pair of supports 33 and 34 are fastened together by means such as screws 35, 36, 37 and 38 extending through clearance holes in the support 34 into correspondingly located tapped holes in the support 33. The supports 33 and 34 also are provided respectively with arcuate openings such as 39 and 40 which, in cooperation with the openings 31 and 32 of the lower pair of supports, form a means of communication to the crossed dichroic reflector plates located internally of the mounting 23.

The lower and upper pairs of supports 26—27 and 33—34, respectively, are fastened together so that the diagonally extending opposite faces thereof are substantially perpendicular to one another. The upper and lower sections of the mounting are fastened together by means of a plurality of screws which are not shown in this figure but are located respectively in counterbores such as 41, 42 and 43 and extend further through clearance holes in the upper pair of supports into correspondingly located tapped holes in the lower pair of supports.

In the perspective view of the mounting shown in Figure 2 there also are shown a pair of adjusting screws 44 and 45 extending at oblique angles through the upper support 33 to bear upon respective resilient pads (not shown in this figure) forming the means by which the half-length dichroic reflector plates are gripped. This feature of the invention will be described in greater detail subsequently with reference to other figures of the drawing.

Each of the reflecting mirrors 18 and 21 is supported by the same sort of mounting. Accordingly, only the mounting used to support the mirror 21 will be described. This mounting includes a turntable 46, which is movably attached to the base plate 22 by means of a plurality of screws such as the screw 47 extending through arcuate slots such as slot 48 into respective tapped holes in the base plate. The mirror mounting also includes a substantially triangular plate 49 to which a base, or horizontal, bracket 51 is secured by means such as rivets or screws 52. The mirror 21 is placed in the bracket and held adjacent its lower edge by a pair of fastening plates such as 53 which are removably attached to the bracket 51. A vertical bracket 54 extending upwardly from the base bracket 51 is provided at its upper end with an extension 55 to which a removable fastening plate 56 may be attached so as to hold the mirror 21 adjacent its upper edge.

The triangular mounting plate 49 is provided with a plurality of rivets, or the like (see Figure 2*a*), the heads 57 of which are on the under side of the plate for bearing upon the upper surface of the turntable 46. Also adjacent to the rear edge of the plate 49 are one or more hold-down screws such as 58 extending through clearance holes in the plate 49 into correspondingly located tapped holes in the turntable 46. There also are provided two adjusting screws 59 and 60 located adjacent the front point of the triangular plate 49. The screw 59 extends through a tapped hole in the plate 49 and has its end bearing upon the upper surface of the turntable 46. The screw 60 extends through a clearance hole in the plate 49 into a correspondingly located tapped hole in the turntable 46.

The described mounting for the mirror 21 permits suitable adjustment of the mirror to properly direct the light which is to be reflected by it from the dichroic reflector to the camera tube associated therewith. The mirror 21 may be rotated about a vertical axis by first loosening the screws, such as 47 attaching the turntable 46 to the base plate 22, and then rotating the turntable and the mirror 21. The arcuate slots 48 are made sufficiently long to provide the desired range of rotative adjustment. The adjustment of the light path from the mirror 21 in the vertical direction is effected by tilting the triangular plate 49, and hence the mirror 21, about a horizontal axis relative to the turntable 46 and base plate 22. This tilting is effected by suitable manipulation of the screws 59 and 60. The screw 60, when loosened, permits the turntable 49 to be tilted by manipulation of the adjusting screw 59. If it is assumed that this is a right hand threaded screw, a clockwise rotation thereof, when viewed from the top, raises the front end of the plate 49, thereby tilting the mirror 21 rearwardly as viewed in this figure, whereby the reflected light path is elevated. A counter clockwise rotation of the screw 59 permits a downward adjustment of the reflected light path when screw 60 is tightened.

Other details of the crossed dichroic reflector mounting are shown in the top view of the device of Figure 3 to which reference now will be made. The upper and lower pairs of supports are fastened together by means including a plurality of screws 61, 62 and 63, respectively, in the counterbores 41, 42 and 43 previously referred to. Also, there is more clearly illustrated the manner in which the screws such as 28, 29 and 30 function to fasten the individual supports together in pairs. This view also indicates the location of the openings in the other two sides of the mounting structure which are not visible in the perspective view of Figure 2. In addition to the openings 31—39 and 32—40 previously described, it is seen that another opening 64 is provided in another one of the walls which is of a similar character to the previously described openings 31—39 and 32—40. In the fourth wall of the mounting structure another opening is formed and is defined by an outwardly extending substantially annular flange 65. As used in the television camera apparatus described in connection with Figure 1, the mounting of the present invention is of such a character that the opening defined by the flange 65 is placed in communication with an optical system, such as represented by the lens 12 of Figure 1. The flange is designed to fit with the mounting structure for the optical system. The other openings 31—39 and 32—40 and 64 provide communication of the crossed dichroic reflector with the blue, green and red camera tubes, respectively, as arranged in Figure 1.

In Figure 3, there also is indicated by broken lines the manner in which the crossed dichroic reflector plates 17, 19 and 20 are mounted in the device embodying the present invention. The supports 33 and 34 comprising the upper pair of supports are fastened together by the described means including screws 35, 36 and 37 to support the half-length plates 19 and 20 between opposing faces of the supports. In this form of the invention the support 33 is provided with a recess 66 in the diagonal face thereof which is joined to the complementary and opposing face of the support 34. The recess has a length which is preferably slightly greater than the combined lengths of the half-length plates 19 and 20 plus the thickness of the full-length plate 17. The depth of the recess 66 is made somewhat greater than the thickness of the plates 19 and 20 for a purpose to be made clearer in view of the following description. A spacer 67 having a thickness substantially equal to the depth of the recess may be inserted between the supports 33 and 34 to maintain the faces thereof parallel at all points.

On either side of the center of the diagonal faces of the supports 33 and 34 there are embedded, respectively, therein a plurality of resilient pads for use in gripping the plates 19 and 20. The half-length plate 19 is gripped by a set of three pads 68, 69 and 70 arranged in a right triangular formation in support 34 as more clearly shown in Figure 5. A similar arrangement of pads 71, 72 and 73 is provided in the diagonal face of the support 34 for mounting the half-length plate 20. The diagonal inner face of the recess 66 of support 33 is provided with correspondingly located resilient pads which are designated by the same reference characters used to indicate the previously described pads of the support 34 and are distinguished therefrom by the addition of a prime. It is seen that, when the two supports 33 and 34 are fastened together in the manner described, the plates 19 and 20 are gripped between the opposite sets of resilient pads and securely held in position thereby.

Also, the full-length plate 17 is mounted in a somewhat similar manner between the opposing diagonal faces of the supports 26 and 27. In this case the support 26 has protruding from the diagonal face thereof three resilient pads 74, 75 and 76. Corresponding pads 74′, 75′ and 76′ are provided in the diagonal face of a recess 77 formed in the face of the support 27 in a manner similar to the previously described pad mounting in the recess 66 of the support 33. The pads 74 and 76 may be located in substantially the same horizontal line and the pads 75 at a somewhat lower point as indicated in Figure 5.

It is seen that al of the dichroic reflector plates are mounted between the diagonal faces of their respective pairs of supports by being gripped at three spaced points between the resilient pads protruding from the faces of the supports. Accordingly, it will be appreciated that there is substantially no strain placed upon the surface of any plate which would tend to distort it. At the same time, the mounting of the plates is sufficiently firm and rigid to prevent relative movement between the plates which would tend to cause misregistration of the different reflected color images.

It should be noted that, in order to minimize strain in all parts of the dichroic reflector plate structures, it is desirable to provide an additional feature in the case where the reflectors have the sandwich type of structure which previously has been indicated as a preferred form. Where such reflector structures are used, thin shims of transparent material, such as cellulose tape, may be placed between the two plates comprising the unitary dichroic reflector. These shims should be located in the areas in which the resilient pads grip the reflector. Thus, it is seen that a similar three-point contact between the inner faces of the two plates is effected, thereby minimizing the strain placed upon these surfaces when the plates are assembled to form a unitary reflector.

It is seen, with particular reference to Figure 5, that each of the two pairs of supports, provided respectively to mount the full- and half-length plates, have a vertical thickness which is only slightly greater than one-half of the width of the plates mounted therein. Accordingly, approximately one-half of each of the plates, in the dimension of its width, extends beyond the pair of supports in which it is mounted. Also, it is seen that the full-length plate 17 is gripped by the pads in its lower half. Accordingly, the upper half of the full-length plate 17 extends upwardly from the pair of supports 26 and 27. The half-length plates 19 and 20, on the other hand, are gripped by the resilient pads in their respective upper halves. As a consequence, the lower halves of the half-length plates extend downwardly from the pair of supports 33 and 34. Accordingly, the lower pair of supports 26 and 27 are provided with diagonally extending channels 78 and 79 respectively. These channels are in substantial alignment when the supports 26 and 27 are fastened together and are perpendicularly related to the diagonal faces of the supports. Hence, when the two pairs of supports are fastened together the channels 78 and 79 receive the downwardly extending portions of the half-length plates 19 and 20. A similar pair of channels 81 and 82 are provided respectively in the upper pair of supports 33 and 34 to accommodate the upwardly extending portion of the full-length plate 17.

The described mounting for the crossed dichroic reflector provides a fixed support for the full-length plate 17 and adjustable supports for the half-length plates 19 and 20. Referring again to Figure 3 of the drawings, the adjusting screws 44 and 45 extend downwardly through the support 33, at an angle of approximately forty-five degrees to the plane of the half-length plates 19 and 20, to respective positions in which the ends of the screws are in contact with the inner ends of the resilient pads 71' and 68', respectively. By an adjustment of the screw 44, whereby it is inserted deeper into the support, the additional pressure which is exerted by the pad 71' upon the half-length plate 20 causes it to be rotated in a clockwise manner about a vertical pivot comprising the pads 72 and 73. Retraction of the screw 44 produces a counterclockwise pivoting of the plate 20 effected by the resilience of the pads. Similarly, the adjustment of the screw 45 produces a pivoting motion of the half-length plate 19 about a vertical axis comprising the pads 69 and 70.

The mounting also is provided with one or more adjusting screws, such as the screw 83, extending through the support 33 to bear upon the pad 73' and making an angle of approximately forty-five degrees with the plate 20 when viewed from the top as in Figure 3. Adjustment of this screw effects a rotation of the plate 20 about a horizontal axis comprising the pads 71 and 72. Also if desired, a somewhat similar adjusting screw 84 may be provided in the support 34. This screw bears against the inner end of the resilient pad 70 and makes approximately a forty-five degree angle with the plate 19 when viewed from the top as in the figure. Adjustment of the screw 84 causes a pivoting of the plate 19 about a horizontal axis comprising the pads 68 and 69. It has been found in practice that this latter screw is not necessary in all cases. Its inclusion, however, does provide an additional degree of adjustment which, in some instances, may be found advantageous.

Furthermore, it should be evident that it is within the scope of the invention to provide facilities, such as adjusting screws, by which to vary the pressure exerted by all three sets of the resilient pads gripping at least one of the half-length plates. By such means, precise coplanarity of the two half-length plates may be achieved so that the images reflected by these plates may be brought to a common focus.

From the foregoing description of an illustrative embodiment of the invention it may be seen that there is provided a mounting for a crossed dichroic reflector of the type having a full-length plate and two substantially half-length plates located at right angles to, and respectively on opposite sides of, the full-length plate and perpendicular thereto and by means of which the half-length plates may be adjusted for mutual coplanarity and parallelism and respective perpendicularity to the full-length plate. Also, the mounting provided by the instant invention is of an improved character whereby substantially no strain is placed upon any surface of the dichroic reflector plates of such a nature as to tend to distort them.

The present embodiment of the invention is particularly adapted for use in a color television camera of the character described. However, color selective optical systems of the character embodied in a crossed dichroic reflector are susceptible of use in systems other than color television systems, such as in photography for example. Accordingly, it is to be understood that the crossed dichroic reflector mounting provided by the instant invention is not to be limited for use in any particular system.

The nature of the invention may be ascertained from the foregoing description of an illustrative embodiment thereof. Its scope is set forth in the following claims.

What is claimed is:

1. A mounting for a crossed dichroic reflector of the type having a full-length first color-selective plate member and two substantially half-length second color-selective plate members located at right angles to and respectively on opposite sides of said full-length plate substantially in the middle thereof, all of said plates being of substantially the same width, said mounting comprising first and second pairs of supports, each of said pairs of supports having opposite faces provided respectively with a plurality of resilient pads protruding therefrom, each of said supports having a thickness equal approximately to at least one-half of the width of said plates, means to fasten said first pair of supports together to cause the pads thereof to grip said full-length plate so that approximately one-half of said full-length plate in the dimension of its width extends beyond the supports in the dimension of their thickness, means to fasten said second pair of supports together to cause the pads thereof to grip said half-length plates so that approximately one-half of said half-length plates in the dimension of their width extend beyond said second pair of supports in the dimension of their thickness, each pair of supports being provided additionally with recesses, and means to fasten said first pair of supports to said second pair of supports so that the plate members gripped respectively thereby have the desired relationship to one another, the recesses in said supports being placed suitably to receive the extending portions of said plates.

2. A crossed dichroic reflector mounting as defined in claim 1 wherein, each of said supports also has external sides in the dimension of its thickness, said sides having openings formed therein of such a character that, when said supports are fastened together, said mounting provides four light paths to said dichroic reflector.

3. A crossed dichroic reflector mounting as defined in claim 1 wherein, at least one of said supports is provided with at least one movable member bearing on at least one of said resilient pads, said movable member being adjustable to move said associated pad relative to the others of said pads, thereby to adjust the position of the plate gripped by said moved pad relative to said other plates.

4. A crossed dichroic reflector mounting as defined in claim 3 wherein, said movable member is located in one of said second pair of supports in a position to adjust the position of one of said half-length plates.

5. A crossed dichroic reflector mounting as defined in claim 4 wherein, at least one of said movable members is provided for each of said half-length plates, whereby both of said half-length plates may be adjustably positioned relative to one another and also to said full-length plate.

6. A crossed dichroic reflector mounting as defined in claim 1 wherein, each of said supports is provided with three of said resilient pads for each of said plates to be supported and at least one of said second pair of supports is provided with a plurality of movable members for one of said half-length plates, whereby the positioning of said plate may be adjusted in a plurality of degrees of freedom.

7. A crossed dichroic reflector mounting as defined in claim 6 wherein, said movable members are two in number, thereby providing an adjustable positioning of said plate in two degrees of freedom.

8. A crossed dichroic reflector mounting as defined in claim 7 wherein, said movable members are screws threaded into holes formed in at least one of said second pair of supports and extending angularly to the surface of said half-length plates.

9. A mounting for a crossed dichroic reflector of the type having a full-length first color-selective plate member and two substantially half-length second color-selective members located at right angles to and respectively on opposite sides of said full-length plate substantially in the middle thereof, all of said plates being of substantially the same width, said mounting comprising a first pair of supports having opposing faces extending respectively in one direction for at least the length of said full-length plate and in the other direction for approximately one-half of the width of said full-length plate, each of said first pair of supports also being provided with a channel having a width and a depth respectively equal approximately to the thickness and to one-half of the width of said half-length plates and extending perpendicularly from approximately the middle of said face, two sets of resilient pads mounted respectively in said first pair of supports so as to protrude from said faces in such a manner that corresponding pads of said two sets are directly opposite to one another, means to join said first pair of supports to cause said pads to grip said full-length plate and to place said channels in substantial alignment, a second pair of supports having opposing faces extending respectively in one direction for at least a distance equal to the combined lengths of said half-length plates plus the thickness of said full-length plate and in the other direction for approximately one-half of the width of said half-length plates, each of said second pair of supports also being provided with a channel having a width and a depth respectively equal approximately to the thickness and to one-half of the width of said full-length plate and extending perpendicularly from approximately the middle of said face, two sets of resilient pads mounted respectively in said second pair of supports so as to protrude from said faces in such a manner that corresponding pads of said two sets are directly opposite to one another, said two sets of pads being divided into two groups located respectively on opposite sides of said second support channels, means to join said second pair of supports to cause said two groups of pads to grip said half-length plates respectively and to place said channels in substantial alignment, and means to join said first pair of supports to said second pair of supports so that the channel of each pair of supports is in position to receive the plate members gripped in the other pair of supports.

LAWRENCE T. SACHTLEBEN.

REFERENCES CITED

The following references are of record in the file of this patent:

UNITED STATES PATENTS

| Number | Name | Date |
|---|---|---|
| 1,140,576 | Conrady et al. | May 25, 1915 |
| 1,299,431 | Dawson | Apr. 8, 1919 |
| 2,128,791 | Benford | Aug. 30, 1938 |

FOREIGN PATENTS

| Number | Country | Date |
|---|---|---|
| 137,176 | Great Britain | Jan. 8, 1920 |